(12) United States Patent
Farres et al.

(10) Patent No.: US 10,343,665 B2
(45) Date of Patent: Jul. 9, 2019

(54) METHOD FOR CONTROLLING THE BRAKING SYSTEM OF A VEHICLE

(71) Applicant: VOLVO TRUCK CORPORATION, Göteborg (SE)

(72) Inventors: Lionel Farres, Saint Priest (FR); Fabrice Ranc, Simandres (FR)

(73) Assignee: Volvo Truck Corporation, Göteborg (SE)

( * ) Notice: Subject to any disclaimer, the term of this patent is extended or adjusted under 35 U.S.C. 154(b) by 362 days.

(21) Appl. No.: 15/038,745

(22) PCT Filed: Dec. 20, 2013

(86) PCT No.: PCT/IB2013/003142
§ 371 (c)(1),
(2) Date: May 24, 2016

(87) PCT Pub. No.: WO2015/092470
PCT Pub. Date: Jun. 25, 2015

(65) Prior Publication Data
US 2016/0375884 A1     Dec. 29, 2016

(51) Int. Cl.
*B60T 13/66* (2006.01)
*B60T 17/18* (2006.01)
*B60T 13/68* (2006.01)

(52) U.S. Cl.
CPC ............ *B60T 13/662* (2013.01); *B60T 13/66* (2013.01); *B60T 13/683* (2013.01); *B60T 17/18* (2013.01); *B60T 2201/06* (2013.01)

(58) Field of Classification Search
CPC ...... B60T 13/66; B60T 13/662; B60T 13/683; B60T 17/18; B60T 2201/06
See application file for complete search history.

(56) References Cited

U.S. PATENT DOCUMENTS

| | | | | |
|---|---|---|---|---|
| 4,018,485 A | * | 4/1977 | Fannin | B60T 11/326 303/13 |
| 4,265,492 A | * | 5/1981 | Pollinger | B60T 17/18 303/14 |
| 4,281,736 A | * | 8/1981 | Lizzio | B60T 7/047 180/271 |
| 2008/0149437 A1 | | 6/2008 | Herges | |

(Continued)

FOREIGN PATENT DOCUMENTS

| | | | | |
|---|---|---|---|---|
| DE | 10238870 A1 | * | 3/2004 | ............... B60T 7/12 |
| DE | 10238870 A1 | | 3/2004 | |

OTHER PUBLICATIONS

International Search Report (dated Sep. 30, 3014) for corresponding International App. PCT/IB2013/003142.

*Primary Examiner* — Jelani A Smith
*Assistant Examiner* — Donald J Wallace
(74) *Attorney, Agent, or Firm* — WRB-IP LLP

(57) ABSTRACT

A method for controlling the braking system of a vehicle when the vehicle is switching from a standstill state where parking brake is applied to a driving state includes at least the following steps: a) detecting at least one starting condition of the vehicle, b) determining at least one parking condition of the vehicle, c) assessing whether said parking condition is favorable or unfavorable, d) if said parking condition is considered to be favorable at step c), starting to release the parking brake, and e) after step d), starting to apply the service brake.

20 Claims, 5 Drawing Sheets

(56) References Cited

U.S. PATENT DOCUMENTS

| | | |
|---|---|---|
| 2010/0211281 A1 | 8/2010 | Baier-Welet et al. |
| 2013/0025951 A1* | 1/2013 | Hilberer ................. B60T 7/122 |
| | | 180/65.21 |
| 2013/0184954 A1* | 7/2013 | Treppenhauer ......... B60T 7/122 |
| | | 701/70 |

* cited by examiner

METHOD FOR CONTROLLING THE BRAKING SYSTEM OF A VEHICLE

BACKGROUND AND SUMMARY

The present invention concerns a method for controlling the braking system of a vehicle when leaving a standstill state where parking brake is applied to a driving state where brakes are released. This method is adapted to vehicles which are equipped with an electronically controlled parking brake system.

In contrast to a mechanical parking brake, which is actuated and disengaged by the driver using a hand-brake lever, a parking brake that is electronically controlled can be automatically released. The park brake force generated in an electronically controlled parking brake is generally high enough to prevent the vehicle from rolling away in any circumstances and whatever the physical parking, conditions under which the vehicle is stopped or parked.

US-A-2008/0149437 discloses a method for automatically braking a vehicle equipped with an electronically controlled parking brake. The braking system is pneumatic and includes a parking brake and a service brake. The parking brake is released when increasing the pressure inside a parking brake cylinder and the service brake is actuated when increasing the pressure in a service brake cylinder. For safety reasons, when leaving the standstill state, the parking brake is released only when the service brake is already producing a minimum braking effect. In this way, there is no risk that the vehicle rolls away, but this entails an extra braking force applied by the braking system. This extra braking force can be determined by summing up the park brake force already applied with the service brake force applied before releasing the parking brake. Occurrence of this extra braking force is better known as «compound effect».

The major drawback of compound effect is that it implies additional constraints within the brake, and consequently, an accelerated fatigue of the brake.

US-A-2010/0211281 discloses a method for applying a parking brake of a vehicle depending on the roadway conditions. This method teaches to adjust the park brake force in function of the conditions in which the vehicle is parked. For example, the slope of the road and the weight of the vehicle affect the park brake force needed to maintain the vehicle in a standstill state. Moreover, weather conditions are also taken into account when determining the suited park brake force. This method does not intend to reduce the compound effect occurring during the transition between the parking brake mode and the service brake mode. Therefore, unless using oversized brakes able to accept compound additional constraints, a compound effect will cause a premature wear of the brake.

It is desirable to provide a method for controlling the braking system of a vehicle in which the compound effect is reduced.

An aspect of the invention concerns a method for controlling, the braking system of a vehicle when switching from a standstill state where parking brake is applied to a driving state of the vehicle. This braking system includes a parking brake and a service brake. The addition of the park brake force and the service brake force gives a total brake force. According to the invention, this method includes at least the following steps:

a) detecting at least one starting condition of the vehicle,
b) determining at least one parking condition of the vehicle,
c) assessing whether said parking condition is favorable or unfavorable,
d) if said parking condition is considered to be favorable at step c), starting to release the parking brake, and
e) after step c), starting to apply the service brake.

Thanks to an aspect of the invention, when the parking conditions are favorable, it is possible to partially release the park brake force without the vehicle rolling away. So, the park brake can start being released before starting to apply the service brake. Since the parking brake is partially released when it is started to apply the service, brake, the accumulation of the park brake effort and the service brake effort does not exceed the park brake force initially applied in standstill state of the vehicle that is to say before step d). In other words, there is no more compound effect. By limiting the occurrence of compound effect all along the brake life, the fatigue on the brake is drastically reduced.

According to further aspects of the invention which are advantageous but not compulsory, such a method may incorporate one or several of the following features:

The following steps f) and g) are implemented:
step f) if said at least one parking condition is considered to be unfavorable at step c), starting to apply the service brake, and
step g) after step f), starting to release the parking brake.
(Currently Amended) The braking system of the vehicle is pneumatic and the release of the parking brake is started by increasing the pressure inside a parking brake chamber and the application of the service brake is started by increasing the pressure in a service brake chamber. More precisely, the release of the parking brake is started by increasing from zero (relative pressure) the pressure inside a parking brake chamber and the application of the service, brake is started by increasing from zero (relative pressure) the pressure in a service brake chamber.

if said parking condition is considered to be favorable at step c), the pressure in the service brake chamber and the pressure in the parking brake chamber are controlled such that, after step d), the total brake force remains inferior or equal to the park brake force initially applied and such that the total brake force remains higher than a minimal brake force necessary to maintain stopped the vehicle. In the present application, the expression "park brake force initially applied" refers to the park brake three applied during the standstill state of the vehicle.

If said parking condition is considered to be favorable at step c), the pressure in the service brake chamber is built up to a target pressure, which is determined such that the total braking force is lower than the park brake force initially applied.

If said parking condition is considered to be favorable at step c), the difference between the total brake force and the park brake force initially applied may vary, after step d), depending on said at least one parking condition or depending on at least one other parking condition and is preferably maximal when the vehicle is stopped on a flat surface.

The maximal difference occurring after step d) between the total brake force and the park brake force initially applied, is superior to an extra braking force occurring after step f) and said extra braking force being equal to the maximum difference, occurring after step f), between the total brake force and the park brake force initially applied when the total brake force is higher than the park brake force initially applied.

The step e) occurs after a period of time has elapsed since step d), this period of time is determined so that the total brake force remains higher than the minimal brake force that is necessary to maintain stopped the vehicle and so that the total brake force remains lower than the park brake force initially applied.

The period of time is preferably comprised between 100 ms and 600 ms.

The duration of the period of time after which step e) occurs depends on the pressure in the parking brake chamber and step e) occurs when the pressure in the parking brake chamber reaches a threshold value.

When said parking condition is considered to be favorable at step c) the pressure in the parking brake chamber and the pressure in the service brake chamber are automatically controlled by at least one control unit during at least steps d) and e).

Said parking condition takes into account the slope gradient of the road or of surface where the vehicle is parked on and/or the weight or the load of the vehicle.

The vehicle is a truck, several parking conditions are determined in step b) and in the parking conditions are favorable when the truck is parked on a road with a slope inferior to 8% and when the truck is loaded with less than 50% of its total capacity.

The vehicle is a truck and said parking condition is favorable when the truck is parked on a road with a slope inferior to 3%.

The parking conditions take into account weather conditions.

The step a) detection of said at least one starting condition comprises detection of the user in the cabin of the vehicle and/or detection of engine start and/or detection of manual gear selection and/or detection of a drive position of the gearbox.

After step e) or g), the method further comprises the step h) and i) where step h) consists in or comprises detecting a driver request for starting the vehicle and, following step h), step i) it consists in or comprises releasing the service brake and, if it is not already released, releasing the parking brake.

Preferably, step h) consists in or comprises detecting a depression of the accelerator pedal by the driver.

BRIEF DESCRIPTION OF THE DRAWINGS

The invention will now be explained in correspondence with the annexed figures, and as an illustrative example. In the annexed figures.

DETAILED DESCRIPTION

Figure 1:
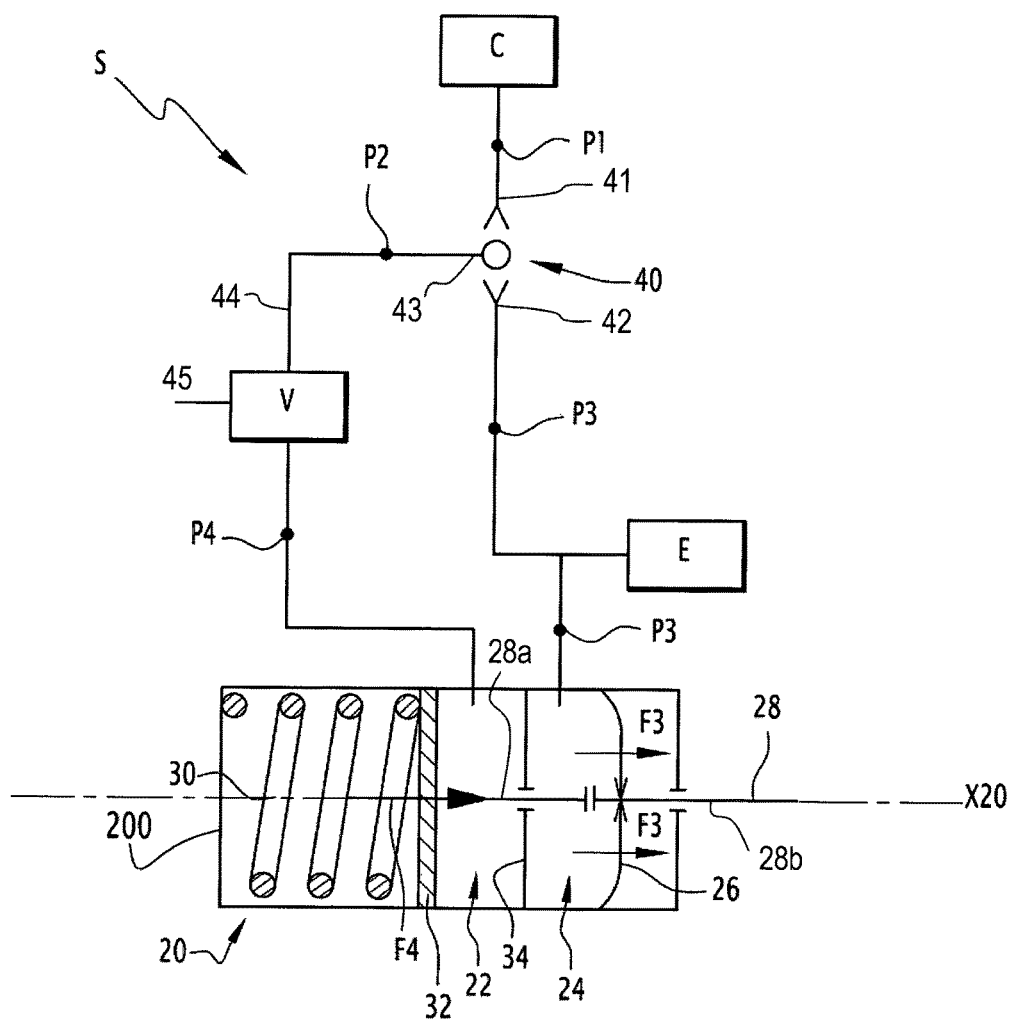
FIG. 1 is a schematic view illustrating the braking system of a vehicle.

In the present description given pressures are relative to the atmosphere pressure. FIG. 1 represents a pneumatic braking system S of a vehicle, such as a truck. Pneumatic braking system S includes a parking brake, which can be electronically controlled by an associated control unit C and a service brake, which can be controlled by the driver using the pedal brake of the vehicle. During the transition period between standstill state and driving state of the vehicle, the service brake pressure is automatically controlled by a control unit E.

The pneumatic braking system S includes a pneumatic brake 20 comprising a cylinder 200 centered on a central axis X20. This cylinder 200 delimits a parking brake chamber 22 and a service brake chamber 24 which are separated from each other within the cylinder 200, for instance, by a wall 34. A piston 32 can move axially inside the cylinder 200 depending on the air pressure inside the chamber 22. The piston 32 has a rod 28 that is preferably composed of at least two parts 28a and 28b. The two parts 28a and 28b are in axial abutment at least when a park brake force F4 is generated by the pneumatic brake 20 and they are at distance from each other when only the service brake force F3 is generated by the pneumatic brake 20. The rod 28 acts indirectly on the wheels of the vehicle to block their rotation motion. All the wheels can be equipped with a braking system S with a parking brake actuator or only the front wheels or the rear wheels can be equipped with a braking system S with a parking brake actuator. On FIG. 1, the parking brake chamber 22 is arranged on the left of the wall 34 while the service brake chamber 24 is arranged on the right of the wall 34. Hereafter, the forward direction is oriented to the right while the backward direction is oriented to the left.

A spring 30 opposes to the backward motion of the piston 32. The action of the spring 30 is balanced by the air pressure in parking brake chamber 22. The parking brake is mechanically applied by the spring 30 when the pressure inside the park brake chamber 22 is reduced. Indeed, a drop of air pressure in the park brake chamber 22 implies an elongation of the spring 30 and a forward movement of the piston 32, which allows creating a park brake force F4 on the wheels of the vehicle.

At standstill state of the vehicle, the air pressure in the parking brake chamber 22 is zero or almost zero and the spring 30 generates a park brake force F4.

A membrane 26 can be fixedly attached inside the cylinder 200 of the pneumatic brake 20 and can also be fixedly attached to the rod 28 of piston 32. The membrane 26 is elastic and delimits, with the wall 34, the service brake chamber 24. When the pressure inside the service brake chamber 24 builds up, the membrane 26 is elastically deformed and leads the piston 32 to move axially in the forward direction as shown by arrows F3. This allows applying a service brake force F3 on the wheels of the vehicle.

As shown on FIG. 1, a selective valve 40 is arranged within the brake system S. This selective valve 40 comprises a first inlet 41 connected to the control unit C of the parking brake and a second inlet 42 connected to the service brake chamber 24. The outlet 43 of the selective valve 40 is connected to the parking brake chamber 22. P1 denotes the pressure in the first inlet 41 of the selective valve 40 and P2 denotes the pressure in the outlet 43 of the selective valve 40. Pressure P1 is a control pressure adjusted by the control unit C. P3 denotes the pressure inside the service brake chamber 24 while P4 denotes the pressure inside the parking brake chamber 22.

The outlet 43 of the selective valve 40 takes the highest pressure between control pressure P1 in the first inlet 41 and pressure P3 in the second inlet 42. In other words P2 equals P1 when P1 is higher than P3 and P2 equals P3 when P1 is lower than P3.

Thanks to the use of a selective 40, the parking brake can be automatically released when service brake pressure is built up.

The pneumatic braking system also comprises several pressure sensors arranged on the pneumatic circuit to measure the different pressures P1, P2, P3, P4.

At standstill state, the service brake pressure P3 and so the service brake three F3 are null while the park brake force F4 is maximal. At driving state, the service brake force F3 is variable, depending on user action on the brake pedal, between a maximal value and a null value and the park brake force F4 is null.

A relay valve V is arranged on the outlet line 44 of the selective valve 40 and is located upstream from the parking brake chamber 22. This relay valve V is fed by a further pneumatic line 45 and adapts the pressure P2 into a pressure. P4 that feeds the parking brake chamber 22.

On figure, the selective valve 40 is at distance from the relay valve V. In a non-represented variant, the selective valve 40 can be attached or arranged in the relay valve V, in this latter case the selective valve and the relay valve can form together a double check valve.

A first step of the method consists in or comprises detecting if the vehicle is about to start or if it is the intention of the driver to start the vehicle. In other words, the first step consists in or comprises detecting if starting conditions of the vehicle are fulfilled. For instance, starting conditions can comprise detection of the user in the cabin of the vehicle and/or detection of engine start and/or detection of manual gear selection and/or detection of a drive position of the gearbox. The second step of the method of the invention consists in or comprises evaluating the physical or roadway conditions in which the vehicle is parked or stopped. In the present application these conditions are referred to as the "parking conditions". Parking conditions can take into account the slope gradient of the road or surface on which the vehicle is parked or stopped and, eventually, the weight or load of the vehicle. Thereupon, the pneumatic braking system S of the vehicle includes several nonrepresented sensors for measuring the slope gradient of the road and the load of the vehicle. The slope sensor can be, for instance, attached to the chassis frame of the vehicle or can be part of the gearbox of the vehicle. The load of the vehicle can be determined by a dedicated load sensor located between the frame and the rear axle. Alternatively, the load of the vehicle can be calculated without the use of a dedicated load sensor, for instance, it can be calculated by one of the control unit C or E controlling braking functions which, depending on the braking force applied and depending on information relative to the deceleration rate of the vehicle and information relative to the motions of the vehicle suspensions, can indirectly determine the weight and so the load of the vehicle.

First and second steps are advantageously but not necessary performed according to the preceding order. This order is preferred because there is few risks that parking conditions vary between their evaluation and the effective release of the parking brake. Indeed, if, for instance, the sequence of these steps is reversed, the parking conditions, that can be evaluated when the vehicle stops, can be modified before detection of starting conditions and therefore before effective release of the parking brake if for instance, the vehicle is loaded or unloaded during its standstill state.

The transition period T can be divided into at least two sub-transition periods Ta and Tb. The first sub-transition period Ta starts when the pressure P4 starts to increase in the parking brake chambers, continues when pressures P3 and P4 increase in both chambers 22 and 24 and ends when service brake pressure P3 reaches a predetermined targeted value P3$targ1$ or P3$targ2$. This first sub-transition Ta period is also identified in the present application as a "switching transition" because during this first sub-transition period parking brake force F4 is partially or totally replaced by service brake force F3. The second sub-transition period Tb starts after Ta and ends when the vehicle enters in the driving state that is to say when the driver depresses the accelerator pedal to start the vehicle. More precisely during the second sub-transition period Tb the service brake pressure P3 is at a target value P3$targ1$ or P3$targ2$. This second sub-transition period Tb is also identified in the present application as a "pre-start transition" because it precedes the moment where the service brake will be automatically release to allow the vehicle to start or restart, and therefore to allow the vehicle entering into the driving state.

Hereafter, Ft denotes the total brake force applied by the sum of the park brake force F4 plus the service brake force F3. Fi denotes the total brake force initially applied, in standstill state when the vehicle is parked and when there is no pressure in both chambers 22 and 24. Fe denotes the total brake force applied during the pre-start transition Tb. Fi and Fe can be substantially constant. Fi equals the park brake force F4 and Fe can equal the service brake force F3 or can equal F3+F4. In the present example, Fi is about 120 kN.

Depending on the parking conditions, it is possible to determine if the park brake force Fi initially applied can be reduced without the vehicle rolling away. If so, the parking conditions are favorable. In this aim, some boundary conditions or threshold values can be set and the current parking conditions are compared to these boundary conditions or threshold values to determine if the vehicle is parked or stopped in favorable or unfavorable parking conditions. Considering the example of a truck, if the truck is loaded with more than 50% of its total capacity and is parked on a slope of 8% or more, parking conditions can be considered as unfavorable. Conversely if a truck is loaded with less than 50% of its total capacity and is parked on a slope inferior to 8% or if a vehicle is parked on a flat surface regardless its load, the vehicle can be considered as being parked in favorable conditions. Parking conditions can take into account only one parameter, for instance, only the gradient of the slope of the road or surface where the vehicle is stopped or parked can be taken into account, in this case, the boundary condition can be a slope of the road of 3% below which parking conditions are considered favorable and above which they are considered unfavorable. Of course, other parking conditions can be taken into account and the preceding boundary conditions or threshold values are given by way of examples because determination of these boundary conditions or threshold values greatly depends on the vehicle type, more especially on its driveline, number of wheels, wheel base, number of brake actuators.

P3$targ1$ denotes a target pressure in the service brake chamber 24 during pre-start transition Tb when parking conditions are favorable and P3$targ2$ denotes a target pressure in the service brake chamber 24 during pre-start transition Tb when parking conditions are unfavorable. The target pressures P3$targ1$ and P3$targ2$ generate, via the membrane 26, respective target forces F3-$targ1$ and F3-$targ2$.

Figure 2:
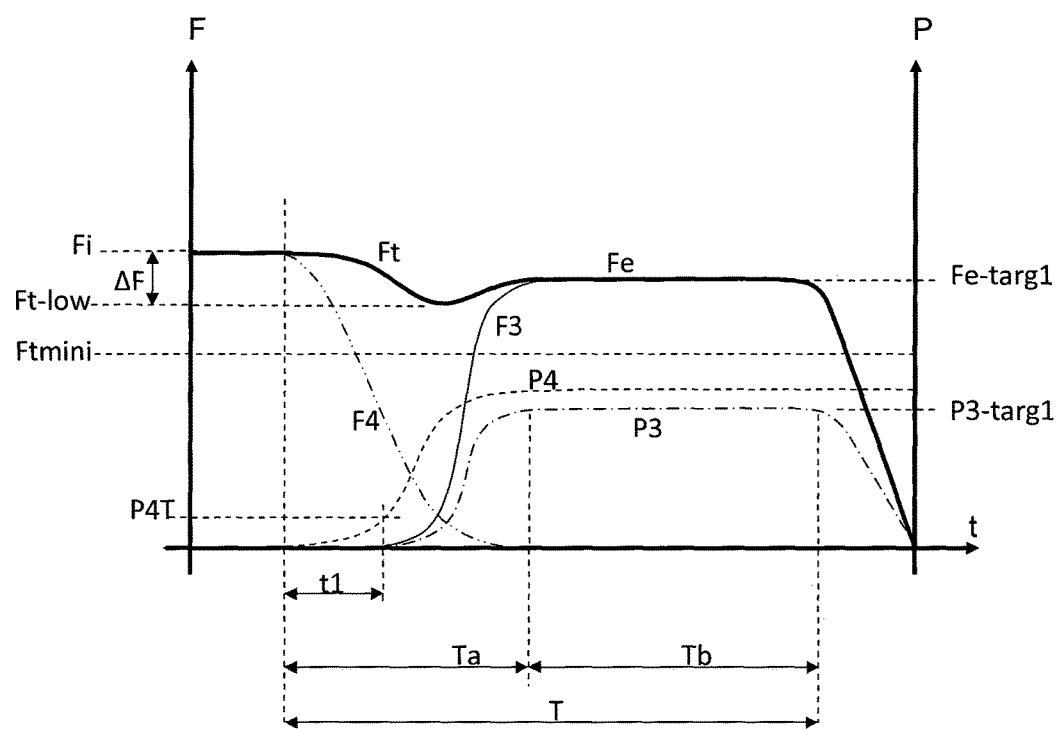
FIG. 2 is a graph representing the total brake three, the service brake force and the park brake force plotted over time and the pressure in a parking brake chamber and the pressure in a service brake chamber plotted over time, this graph illustrating the application of the method when parking conditions are favorable.
Figure 3:
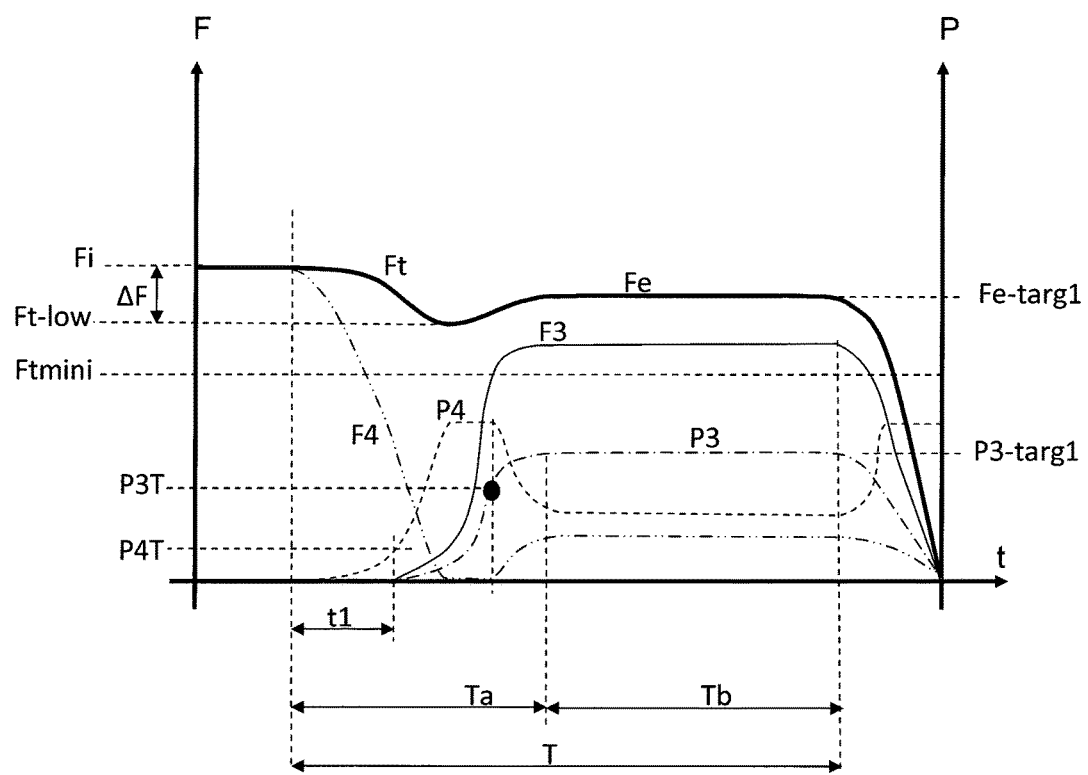
FIG. 3 is a graph similar to FIG. 2 when parking conditions are favorable and where parking brake is partially applied during a pre-start transition.
Figure 4:
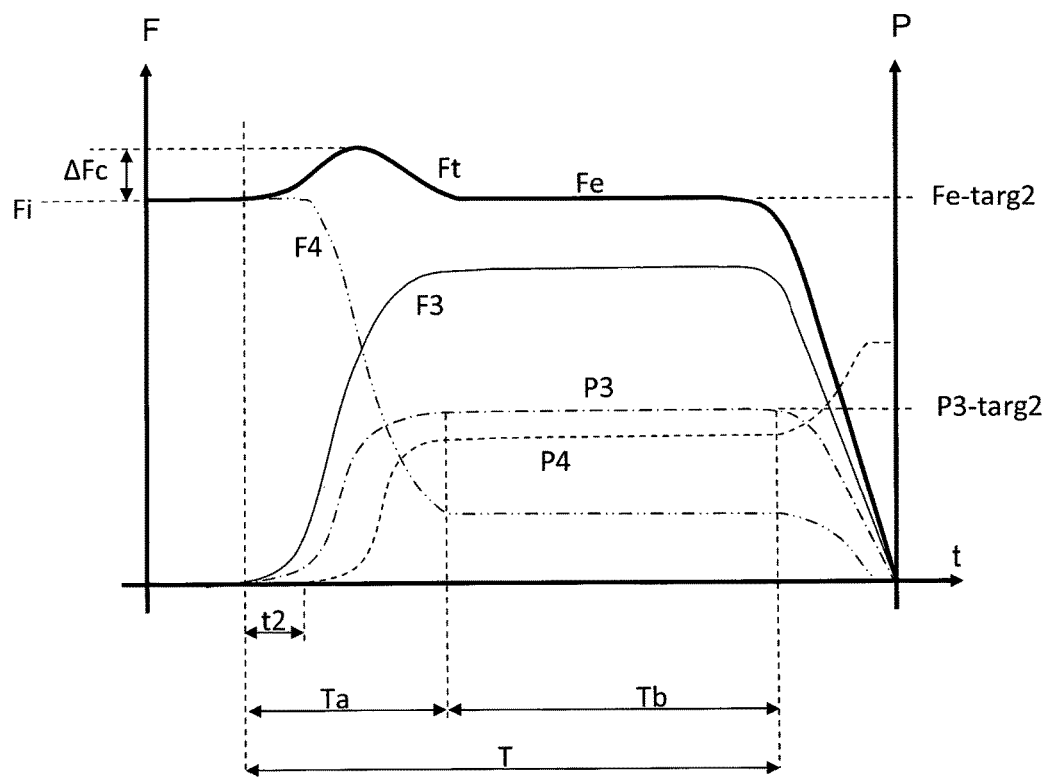
FIG. 4 is a graph similar to FIG. 2 when parking conditions are unfavorable.

On FIGS. 2, 3 and 4, the total brake force Ft is represented by a bold line, the pressure P4 in the parking brake chamber 22 is represented with a dashed line, while the pressure P3 in the service brake chamber 24 is represented with a dash-dotted line. The park brake force F4 is also represented with a dash-dotted line, with a different style than the line of P4, and the service brake force F3 is represented by a full line.

Release of the parking brake is obtained by increasing pressure P4 in chamber 22. Actuation of the service brake is obtained by increasing pressure P3 in chamber 24.

If the vehicle is in favorable conditions and if starting conditions are detected, the method includes a step of starting to release the parking brake before starting to apply the service brake. More precisely and as shown on FIG. 2, release of the parking brake implies, during the switching transition Ta, a decrease AF of the total brake force Ft below Fi. This decrease AF of the total brake force Ft is determined to avoid the compound effect AFc that is to say an addition of pressure P3 and P4 that causes a total brake force Ft that is higher than Fi. On the other hand the decrease AF is also determined such that, during the switching transition Ta, Ft doesn't fall below a force Ftmini that is minimal to maintain the vehicle stopped. Under favorable condition, AF can correspond to a decrease of 10% to 20% compared to Fi. In the examples represented on FIGS. 2 and 3, Fi is about 120 kN and the decrease AF is about 20 kN.

According to the invention, the increase from zero of the pressure P3 in the service brake chamber 24 starts only after that the pressure P4 in the parking brake chamber 22 has started to increase from zero. The starting point to increase pressure P3 in the service brake chamber 24 can be determined directly by calculating a time laps t1 following the start of pressure increase P4 in the parking brake chamber 22. When this time laps t1 is elapsed, the control unit E triggers the increase from zero of the pressure P3 in the service brake chamber 24. The time laps t1 is preferably long enough to avoid compound effect AFc during the switching transition Ta. In other words time laps t1 is long enough to avoid an addition of pressure P3 and P4 that results in a total brake force Ft that is higher than Fi.

On the other hand, the time laps t1 has to be short enough to avoid, during the switching period Ta, a decrease of the total brake force Ft below a value Ftmini that is minimal to maintain the vehicle stopped. Ftmini can be a fixed value, meaning that Ftmini remains the same every time favorable parking conditions are detected, or it can be re-calculated, every time the vehicle stops or every time favorable parking conditions are detected, depending on the same parking conditions as previously described and/or depending on further conditions. A safety coefficient can be applied to Ftmini.

In practice t1 is long enough to cover duration of the compound effect AFc, it can also be shorter it for instance, increase rate of force F3 is lower than decrease rate of force F4.

Advantageously, t1 can be comprised between 100 ms and 600 ms and t1 is preferably superior to 200 ms.

In a different way, the time laps t1 can be indirectly determined. For instance, the starting point for pressure increase P3 can be determined depending on pressure P4 in the parking brake chamber 22. To be more precise, the increase from zero of the pressure P3 in the service brake chamber 24 can be triggered when the pressure P4 in the parking brake chamber 22 reaches a threshold value P4T. By taking into account the rate of pressure increase in chambers 22 and 24, the threshold value P4T is determined to avoid, during the switching transition Ta, a compound effect AFc and a decrease of the total brake force Ft below the minimum value Ftmini previously described. Advantageously, P4T is chosen between 1 and 15% of the pressure P4 that is necessary to completely release the parking brake force F4 (F4=0). For instance, a pressure P4 equal to 5.5 bars can be sufficient to completely release the parking brake force F4.

When the vehicle is parked or stopped under favorable parking conditions, during the switching transition Ta the service brake pressure P3, controlled by the control unit E, is progressively increased until reaching the target pressure P3targ1. P3targ1 is calculated by the control unit F depending on a target value Fe-targ1 of the total braking force Fe that is applied during pre-start transition Tb. Fe-targ1 is determined when the vehicle is parked or stopped under favorable parking conditions and is determined to be higher than Ftmini. Advantageously and in order to limit mechanical stress, Fe-targ1 can be determined to be below Fi.

Without departing from the scope of the invention as claimed it can also be chosen to make Fe-targ1 equal to Fi even if vehicle is stopped wider favorable parking conditions.

Fe-targ1 may be a fixed value, that is to say a value that remains the same every time the method is implemented when parking conditions are favorable or it can vary and be re-adjusted every time the method is implemented when parking conditions are favorable depending, for instance, on Ft-mini which is this case can also be re-calculated depending on parking conditions and/or further conditions.

For instance, if Fe-targ1 is determined as a fixed value when the vehicle is parked or stopped under favorable parking conditions, it can be decreased between 0% and 20% compared to Fi. P3targ1 is determined accordingly. P3 is increased up to P3targ1 during switching transition Ta and is maintained at P3targ1 during the pre-start transition Tb.

Alternatively and such as previously explained, when the vehicle is stopped or parked under favorable parking conditions, Ftmini and Fe-targ1 can be re-adjusted, for instance, every time the vehicle stops or every time starting conditions are detected and Ftmini can be re-calculated depending, for instance, on the slope gradient of the road or of parking surface. In this case, Fe-targ1 can be a variable value decreased between 0% and 20% compared to Fi. When the vehicle is stopped on a horizontal parking surface and Fe-targ1 is for instance decreased from 20% compared to Fi, P3targ1 is thus determined by the control unit E so that it corresponds to a low pressure compared to the maximum permissible pressure P3max in the service brake chamber 24. For instance, P3targ1 can be comprised between 40 and 60% of the maximum authorized pressure (P3max=10 bars) in the service brake chamber 24. For instance, P3targ1 may be about 5 bars if the maximum permissible pressure P3max is about 10 bars. During switching transition Ta and under favorable conditions, P3 pressure is increased up to P3targ1 and this pressure is maintained during pre-start-transition Tb.

Under favorable conditions and during the pre-start transition Tb, the control unit C can control the park brake function to prevent park brake activation, this is performed by maintaining a sufficient high pressure P4 in the park brake chamber 22 to push backward the spring 30 in a release position. A sufficient high pressure can be higher than 5.5 bars. In practice, park brake activation is prevented by applying the maximum pressure P4max in the park brake chamber 22. For instance, P4max is equal to 8.5 bars. In this case and such as represented on FIG. 2, Fe equals F3.

In a variant such as illustrated on the graph of FIG. 3, the control unit C can stop controlling the park brake function, in this case the control pressure P1 becomes equal to zero. The stop of control by the control unit C can occur, for instance, as soon as the pre-start transition Tb is reached that is to say when P3 has reached the target value P3$targ1$ or sooner when during the switching transition Ta the increasing service brake pressure P3 becomes equal to P1 or when P3 reaches a threshold value P3T determined with respect to P3$targ1$. For instance, P3T can equal 70% of P3$targ1$. In this variant, it results from the absence of control of the parking brake function by the control unit C, that the pressure P4 is not equal to P4$max$ and is function of the service brake pressure P3 according to the operating rules of the selective valve 40 and the relay valve V. According to this variant, the parking brake F4 may be partially applied during Tb such that Fe equals F3+F4.

The laws of evolution of the pressure P3 in the service brake chamber 24 and of the pressure P4 in the parking brake chamber 22 can be determined so that the minimum value Ft-low reached by Ft during the switching transition Ta and corresponding to Fi minus AF is maintained during pre-start transition Tb such that Fe-targ1 equals Ft-low.

As shown on FIGS. 2 and 3, by starting to release the parking brake before starting to activate the service brake, the compound effect AFc is avoided. Indeed, the service brake starts being applied when the parking brake is at least partially released. The accumulation of the park brake force F4 and the service brake force F3 does not exceed the park brake force Fi initially applied. In that way, there are no additional constraints applying on the brake during the transition between standstill state and driving state and more precisely during switching transition Ta.

If the physical conditions are unfavorable or if one of the sensors malfunctions, the method keeps the classical way for controlling the braking system S, as shown FIG. 4. In that case, the service brake F3 starts to be applied before the pressure P4 starts to increase in the park brake chamber 22 and therefore before the parking brake F4 starts being released.

This way to operate is safer because the service brake is already producing a minimum braking effect F3 when the park brake force F4 starts dropping. In that way, there is no risk that the vehicle rolls away. However, this implies the formation of an extra braking force AFc which corresponds to the compound effect.

Therefore, the method does not aim to avoid the compound effect in every situation. The method intends to keep compound effect AFc only when necessary, that is when the vehicle is parked or stopped under unfavorable parking conditions. However, considering that a vehicle is most of the time parked on flat roads, thanks to the invention compound effect occurs quite rarely.

Avoiding as much as possible situations where compound occurs allows increasing the life time of the pneumatic brake 20.

When parking conditions are unfavorable, the target force Fe-targ2 of the total brake force Fe can be a fixed value and can be approximately equal to the park brake force Fi initially applied in standstill state. P3$targ2$ is determined in function of Fe-targ2.

During switching transition Ta, P3 is increased up to P3$targ2$ and is maintained to P3$targ2$ during pre-start transition Tb.

Preferably, under unfavorable parking conditions, during switching transition Ta and pre-start transition Tb, the control unit C doesn't control the park brake function and P4 is function of P3 according to the operating rules of the selective valve 40 and relay valve V. Therefore during pre-start transition Tb and when parking conditions are unfavorable, the parking brake remains preferably partially applied such that Fe equals F3+F4.

As shown FIGS. 2, 3 and 4, the Fe-targ1 applied under favorable parking conditions and during the pre-start transition Tb is preferably lower than Fe-targ2 applied under unfavorable parking conditions and during the pre-start transition Tb in order to further limit stress of the mechanical parts of the brake system.

Figure 5:
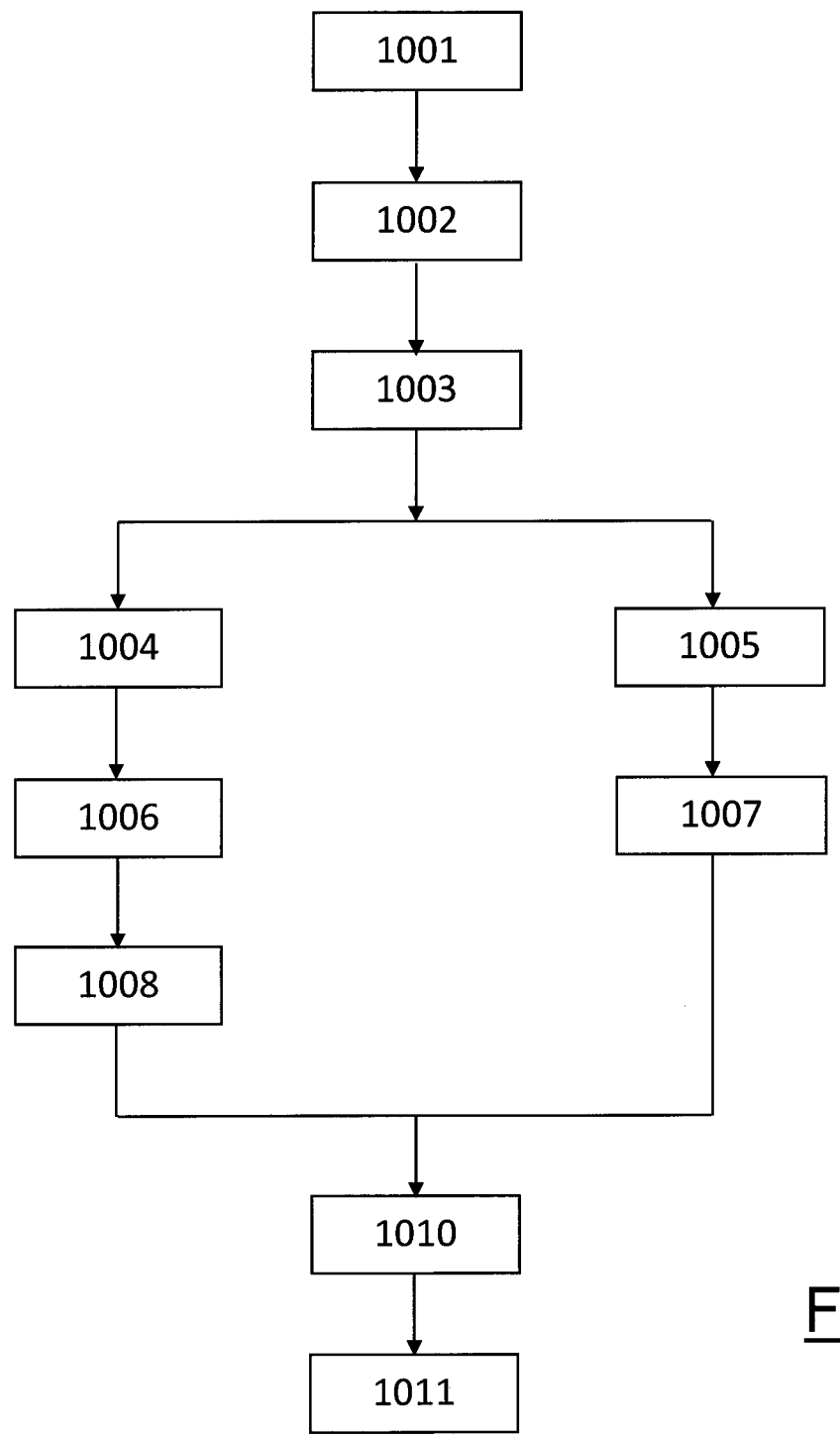
FIG. 5 is a flowchart illustrating the different steps of a method according to the invention.

The method of the invention is schematically represented on FIG. 5 which shows the different steps occurring between the standstill state and the driving state of a vehicle.

In the standstill state, the pressures P1 to P4 are all equal to 0 bar, which means that the action of the spring 30 keeps the piston 32 in a forward position. The parking brake is therefore applied. A first step 1001 consists in or comprises detecting starting conditions of the vehicle. These starting conditions can be, for instance, detection of the driver in the cabin of the vehicle and/or detection of engine start and/or detection of manual gear selection and/or detection of a drive position of the gearbox.

As previously explained, a next step 1002 consists in or comprises measuring different parameters to evaluate the physical conditions in which the vehicle is parked. In the example, the vehicle is equipped with sensors to collect parameters relating to the slope of the road and to the load of the vehicle.

In a third step 1003, control unit C compares the data collected at step 1002 with some threshold values stored in a memory in order to assess if the physical parking conditions can be considered as «favorable» or not. Basically, parking conditions are said to be favorable if the park brake force Fi initially applied at standstill state can be reduced without the vehicle rolling away. The determination of the threshold values to evaluate if the vehicle is parked or stopped under favorable or unfavorable conditions greatly depend on the vehicle type, more especially on its driveline, number of wheels, wheel base, number of brake actuators.

Then, if the parking conditions are considered to be favorable, the method includes a further step 1004 which consists in or comprises starting to release the parking brake.

During the step 1004, the control pressure P1 is increased from zero in order to start to release the parking brake. The pressure P2 at the outlet 43 of the selective valve 40 is progressively increased with the same pressure as P1. The pressure P4 in the parking brake chamber 22 is function of P2 according to the operating rules of the relay valve V and progressively increased from 0. In a given example of brake circuit configuration, P4 remains zero until the pressure P2 a threshold value P2th that can be comprised between 1.2 and 1.9 bar depending on the type of relay valve V that is used and starts to progressively increase as soon as pressure P2 exceeds P2th. In this way, the parking brake starts being released.

Afterwards, the method is implemented with a step 1006 which consists in or comprises starting to apply the service brake, i.e. increasing the pressure P3 in the service brake chamber 24. In the given example, the pressure P3 starts to increase after an elapsed time t1 following the start of pressure increase P4 in the park brake chamber 22. Consequently, during the switching transition Ta, there is an addition of the park brake force F4 to the service brake force F3 but this addition of forces leads to a total brake force Ft which remains inferior to the park brake force Fi initially applied when the vehicle was at standstill state. As previously explained, time laps t1 is also determined such that Ft remains superior to Ftmini during the switching transition Ta.

In a next step 1008 and controlled by the Control unit E, the pressure P3 in the service brake chamber 24 continues to raise up to P3*targ*1. As previously explained P3*targ*1 is determined depending on Fe-targ1 that must remain higher than Ftmini. Fe-targ1 can be equal to Fi but advantageously and in order to reduce mechanical stress of the braking system, Fe-targ1 is lower than Fi and P3*targ*1 is determined accordingly.

In an implementation of the method (see FIG. 2) and meanwhile pressure P3 raises up to P3*targ*1, pressure P4, via a control of pressure P1, may continue to raise up to P4*max* which further compresses spring 30 and completely release the park brake. For instance, P4*max* may be equal to 8.5 bars. In practice a pressure P4 higher than 5.5 bars can be sufficient to push backward the spring 30 and to completely release the park brake. Thus F4 decreases from 120 kN to 0 as the pressure P4 increases from 0 to 5.5 bars and F4 remains at 0 when the pressure P4 continues to increase from 5.5 bars to 8.5 bars. The pressure P4 can be maintained at P4*max* during the pre-start transition Tb.

In a different implementation of the method (see FIG. 3) when P3 has reached P3*targ*1, has reached the current value of pressure P1 or has reached a predetermined threshold value P3T, the control unit C can stop controlling the park brake function, in this case pressure P1 becomes equal zero (P1=0) and pressure P2 and therefore pressure P4 becomes dependent on the service brake pressure P3 according to the operating rules of the selective valve 40. If, for instance, P3*targ*1 equals 4 bars then P4 can equal 3.2 bars. In this case, parking brake F4 is partially applied during pre-start transition Tb such that Fe equals F3+F4 and remains inferior to Fi thanks to the selective valve 40.

If the parking conditions are unfavorable or if the system S lacks some information, for instance, if one sensor is not operational, the steps 1004, 1006 and 1008 do not occur. Instead, a step 1005 occurs directly after the step 1003 and consists in or comprises building up the pressure P3 up to P3*targ*2 while keeping the pressure P2, and therefore P4, at 0 bar. After the period t2 has elapsed since the activation of step 1005, in a next step 1007 the pressure P2 is built up depending on pressure P3 and according to the operating rules of the selective valve 40 in order to partially (FIG. 4) or totally release the parking brake F4.

Finally, in a step 1011 that does not depend on parking conditions, the service brake and, if not already released, the parking brake are completely released if it is detected in a previous step 1010 an action of the driver to start the vehicle, for instance, when the driver depresses the accelerator pedal. At the step 1011, the control pressure P1 can already be at a pressure level where the parking, brake is completely released (FIG. 2). If not, during step 1011, the control pressure P1 is built up to P4*max* (ex: 8.5 bars) to completely release the park brake. The service brake is released by reducing the pressure P3 inside the service brake chamber 24. More precisely, the chamber 24 is emptied, so that the pressure P3 falls to 0 bar and the service brake is completely released.

As an alternative, other criteria can be chosen to determine if the parking conditions in which the vehicle is parked are favorable or not. For instance, weather conditions might be relevant. Indeed, raining conditions might lead to a slippery road and the vehicle has less grip.

Moreover, only one parameter listed here-above can be used to determine if the physical conditions are favorable, namely vehicle load or slope gradient.

The values for P3*targ*1, P3*targ*2, P3*max*, P4*max*, Fi, Fe, Ftmini, Ft-low, Fe-targ1 and Fe-targ2 are given above as an example. Nevertheless, other values for these parameters are possible.

The technical features of the different embodiments and alternative embodiments of the invention can be combined together to generate new embodiments of the invention.

The invention claimed is:

1. Method for controlling the braking system of a vehicle, that includes a parking brake and a service brake, when the vehicle is switching from a standstill state where parking brake is applied to a driving state, the addition of the park brake force and the service brake force giving a total brake force, the method comprising the following steps:
  a) detecting at least one starting condition of the vehicle,
  b) determining at least one parking condition of the vehicle,
  c) assessing whether the parking condition is favorable or unfavorable,
  d) when the parking condition is considered to be favorable at step c), starting to release the parking brake, and
  e) after step d), starting to apply the service brake,
  wherein, when the parking condition is considered to be favorable at step c), a pressure in the service brake chamber and the pressure in the parking brake chamber are controlled such that, after step d), the total brake force remains inferior or equal to the park brake force initially applied and such that the total brake force remains higher than a minimal brake force necessary to maintain stopped the vehicle, wherein, when the parking condition is considered to be favorable at step c), the pressure in the service brake chamber is built up to a target pressure, which is determined such that the total braking force is lower than the park brake force initially applied.

2. Method according to claim 1, wherein the braking system of the vehicle is pneumatic, release of the parking brake is started by increasing pressure inside a parking brake chamber, and application of the service brake is started by increasing pressure in a service brake chamber, and wherein when the parking condition is considered to be favorable at step c) the pressure in the parking brake chamber and the pressure in the service brake chamber are automatically controlled by at least one control unit during at least steps d) and e).

3. Method according to claim 1, wherein the at least one parking condition takes into account the slope gradient of the road or of surface where the vehicle is parked on and/or the weight or the load of the vehicle.

4. Method according to claim 3, wherein the vehicle is a truck, and several parking conditions are determined in step b) and in that the parking conditions are favorable when the truck is parked on a road with a slope inferior to 8% and when the truck is loaded with less than 50% of its total capacity.

5. Method according to claim 3, wherein the vehicle is a truck and in that the parking condition is favorable when the truck is parked on a road with a slope inferior to 3%.

6. Method according to claim 1, wherein the at least one parking condition takes into account weather conditions.

7. Method according to claim 1, wherein in step a) detection of the at least one starting condition comprises detection of the driver in the cabin of the vehicle and/or detection of engine start and/or detection of manual gear selection and/or detection of a drive position of the gearbox.

8. Method according to claim 1, further comprising
f) when the at least one parking condition is considered to be unfavorable at step c), starting to apply the service brake,
g) after step f), starting to release the parking brake, and after step e) or g), the steps h) and i) where step h) comprises detecting a driver request for starting the vehicle and following step h) step i) comprises releasing the service brake and, if it is not already released, releasing the parking brake.

9. Method according to claim 8, wherein step h) comprises detecting a depression of the accelerator pedal by the driver.

10. Method for controlling the braking system of a vehicle, that includes a parking brake and a service brake, when the vehicle is switching from a standstill state where parking brake is applied to a driving state, the addition of the park brake force and the service brake force giving a total brake force, the method comprising the following steps:
a) detecting at least one starting condition of the vehicle,
b) determining at least one parking condition of the vehicle,
c) assessing whether the parking condition is favorable or unfavorable,
d) when the parking condition is considered to be favorable at step c), starting to release the parking brake, and
e) after step d), starting to apply the service brake,
wherein, when the parking condition is considered to be favorable at step c), a pressure in the service brake chamber and the pressure in the parking brake chamber are controlled such that, after step d), the total brake force remains inferior or equal to the park brake force initially applied and such that the total brake force remains higher than a minimal brake force necessary to maintain stopped the vehicle, wherein, when the parking condition is considered to be favorable at step c), the difference between the total brake force and the park brake force initially applied may vary, after step d), depending on the at least one parking condition or depending on at least one other parking condition and is preferably maximal when the vehicle is stopped on a flat surface.

11. Method according to claim 10, wherein the braking system of the vehicle is pneumatic, release of the parking brake is started by increasing pressure inside a parking brake chamber, and application of the service brake is started by increasing pressure in a service brake chamber, and wherein when the parking condition is considered to be favorable at step c) the pressure in the parking brake chamber and the pressure in the service brake chamber are automatically controlled by at least one control unit during at least steps d) and e).

12. Method according to claim 10, wherein the at least one parking condition takes into account the slope gradient of the road or of surface where the vehicle is parked on and/or the weight or the load of the vehicle.

13. Method according to claim 10, wherein the at least one parking condition takes into account weather conditions.

14. Method according to claim 10, wherein in step a) detection of the at least one starting condition comprises detection of the driver in the cabin of the vehicle and/or detection of engine start and/or detection of manual gear selection and/or detection of a drive position of the gearbox.

15. Method according to claim 10, further comprising
f) when the at least one parking condition is considered to be unfavorable at step c), starting to apply the service brake,
g) after step f), starting to release the parking brake, and after step e) or g), the steps h) and i) where step h) comprises detecting a driver request for starting the vehicle and following step h) step i) comprises releasing the service brake and, if it is not already released, releasing the parking brake.

16. Method according to claim 15, wherein step h) comprises detecting a depression of the accelerator pedal by the driver.

17. Method for controlling the braking system of a vehicle, that includes a parking brake and a service brake, when the vehicle is switching from a standstill state where parking brake is applied to a driving state, the addition of the park brake force and the service brake force giving a total brake force, the method comprising the following steps:
a) detecting at least one starting condition of the vehicle,
b) determining at least one parking condition of the vehicle,
c) assessing whether the parking condition is favorable or unfavorable,
d) when the parking condition is considered to be favorable at step c), starting to release the parking brake, and
e) after step d), starting to apply the service brake,
f) when the at least one parking condition is considered to be unfavorable at step c), starting to apply the service brake, and
g) after step f), starting to release the parking brake, wherein, when the parking condition is considered to be favorable at step c), the pressure in the service brake chamber and the pressure in the parking brake chamber are controlled such that, after step d), the total brake force remains inferior or equal to the park brake force initially applied and such that the total brake force remains higher than a minimal brake force necessary to maintain stopped the vehicle, and wherein the maximal difference occurring after step d) between the total brake force and the park brake force initially applied, is superior to an extra braking force occurring after step f) and the extra braking force being equal to the maximum difference, occurring after step f), between the total brake force and the park brake force initially applied when the total brake force is higher than the park brake force initially applied.

18. Method for controlling the braking system of a vehicle, that includes a parking brake and a service brake, when the vehicle is switching from a standstill state where parking brake is applied to a driving state, the addition of the park brake force and the service brake force giving a total brake force, the method comprising the following steps:
a) detecting at least one starting condition of the vehicle,
b) determining at least one parking condition of the vehicle,
c) assessing whether the parking condition is favorable or unfavorable,
d) when the parking condition is considered to be favorable at step c), starting to release the parking brake, and
e) after step d), starting to apply the service brake,
wherein the step e) occurs after a period of time has elapsed since step d), this period of time is determined so that the total brake force remains higher than the minimal brake force that is necessary to maintain stopped the vehicle and so that the total brake force remains lower than the park brake force initially applied.

19. Method according to claim 18, wherein the period of time is comprised between 100 ms and 600 ms.

20. Method according to claim 18, wherein the duration of the period of time after which step e) occurs depends on the pressure in the parking brake chamber and in that step e) occurs when the pressure in the parking brake chamber reaches a threshold value.

\* \* \* \* \*